UNITED STATES PATENT OFFICE.

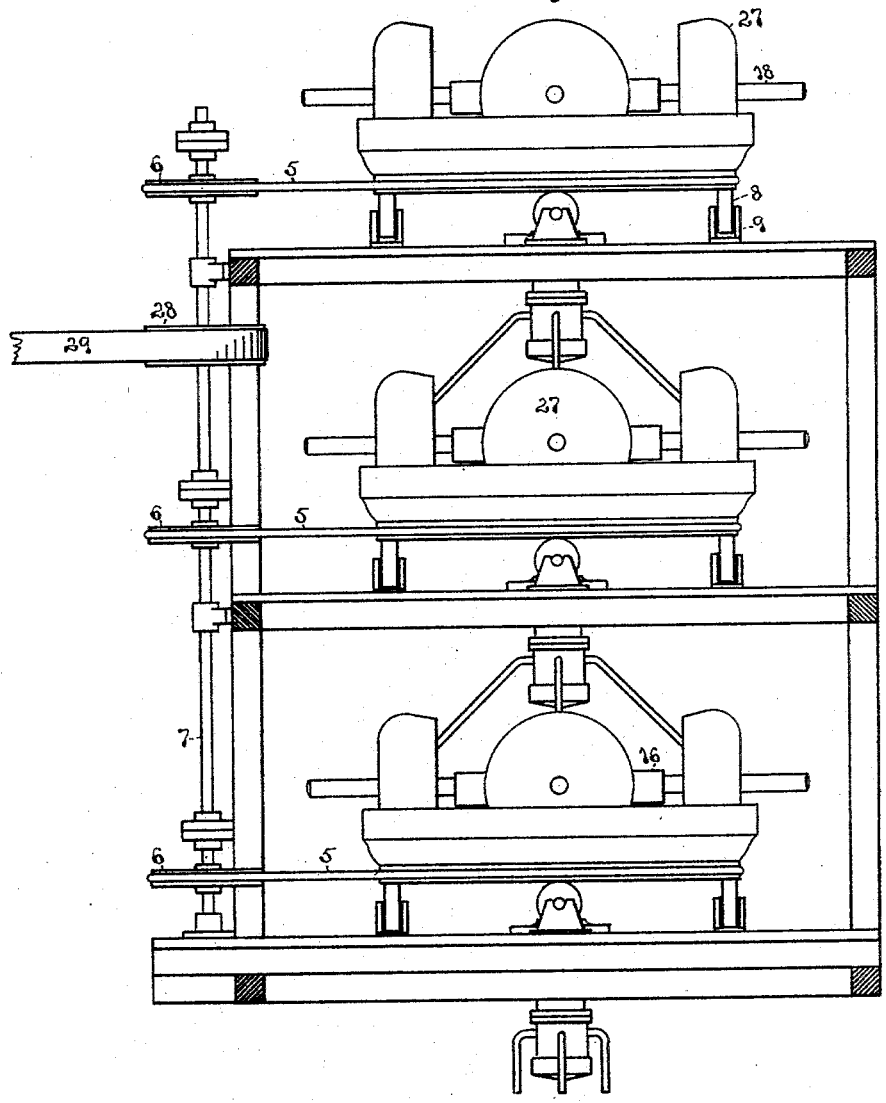

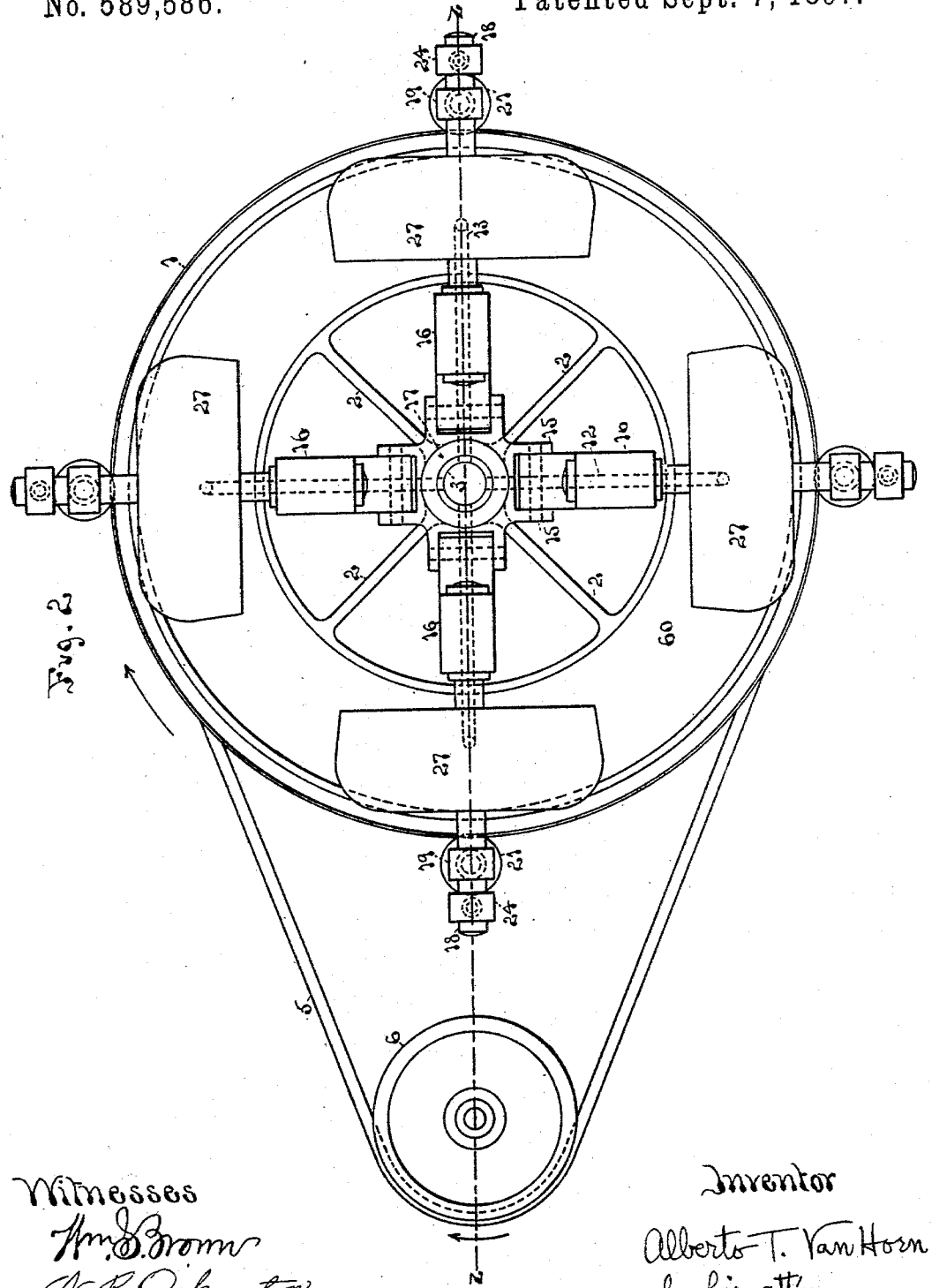

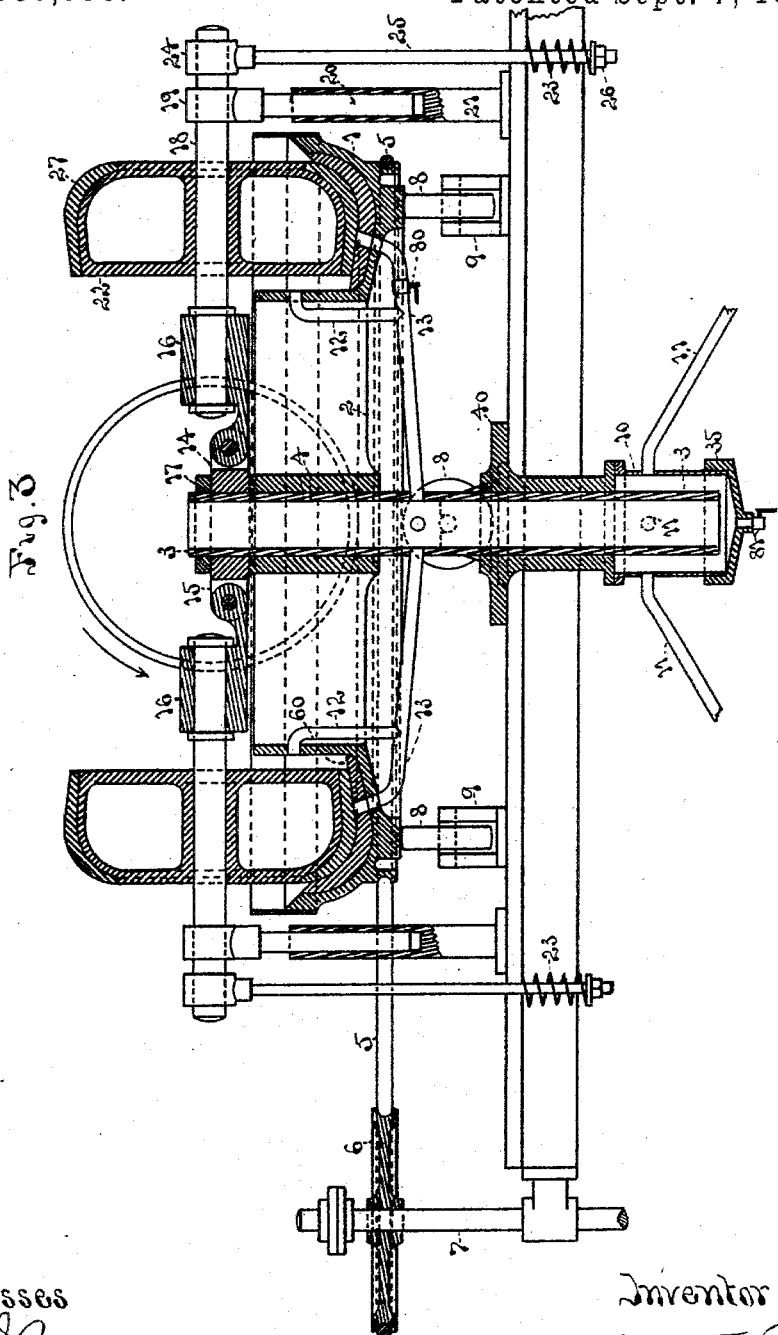

ALBERTO T. VAN HORN, OF BOSTON, MASSACHUSETTS, ASSIGNOR TO THE VAN HORN MANUFACTURING AND PROCESS COMPANY, OF NEW HAMPSHIRE.

QUARTZ-MILLING MACHINE.

SPECIFICATION forming part of Letters Patent No. 589,586, dated September 7, 1897.

Application filed September 29, 1894. Serial No. 524,447. (No model.)

*To all whom it may concern:*

Be it known that I, ALBERTO T. VAN HORN, of Boston, in the county of Suffolk and State of Massachusetts, have invented a new and useful Improvement in Quartz-Milling Machines, of which the following is a specification.

My invention relates to quartz-milling machines; and it consists in certain new and useful constructions and combinations of the parts of the same, substantially as hereinafter described and claimed.

In the drawings, Figure 1 is a side view of the entire system, omitting the bearings on the outer ends of the roller-shafts, represented as arranged vertically on several floors or platforms. Fig. 2 is a top view of one of the machines. Fig. 3 is a vertical section on the line $z z$ of Fig. 2.

An annular pan 1 supports by means of web-spokes 2 2 a central tube 4, through which is run a hollow shaft 3, firmly attached thereto. The lower outer edge of the pan is arranged for the use of a driving-cable 5, which runs over a pulley 6 on the main driving-shaft 7, placed at any convenient point, for which cable and groove a sprocket-chain and teeth or a belt and pulley surface might be substituted. In the bottom of the pan is inserted or bolted a ring which rests on rollers 8, placed at suitable distances apart around the said ring and suitably journaled to supports 9 on the floor.

The shaft 3 runs down through the bearing 40 in the floor and ends in a receptacle or trap 10 for quicksilver. This receptacle is attached by bolts to the bearing 40 and its bottom is firmly screwed on and is provided with a draining-cock 81. From the receptacle pipes 11 11 lead down to the pan of the next machine. It will be noticed that simply locking the cock 81 makes it impossible to meddle with the trap in any way to steal amalgam from it.

A discharge-pipe 12 leads from the inner wall of the pan into the central pipe, there being as many of these pipes from the pan as may be required. Each of these outlet-pipes 12 has a branch 13 leading from the bottom of the pan and furnished with a plug-cock 80, to be opened only when it is desired to clean out the pan.

Around the central shaft, just above the tube forming the hub of the pan, is journaled a ring 14, having sets of ears 15 15, to which are pivoted journal-bearings 16 16. This ring is held down by a collar 17 on the shaft. In each of these journal-bearings is fitted the inner end of a shaft 18, whose outer end is journaled in a bearing 19, mounted on the end of a plunger 20, which slides in an upright tube 21, fixed to the floor.

Each shaft bears a heavy roller 22, which rests upon the bottom of the pan not only with the force of its own weight, but with the added pressure of a powerful spring 23, acting on the end of the shaft by means of the bearing 24 and connecting-rod 25. The spring is adjusted by means of a check-nut 26 on the end of the rod. The rollers are shod with a steel tire 27 to take the wear. An annular shoe 60 for the same purpose is fitted into the bottom of the pan.

It is apparent that if any one of the rollers gets out of order the pivoted journal-bearing 16 allows it to be raised out of the pan and it can be blocked up on the outer end, the spring 23 being released, just as one stamp in a battery can be hung up while the others still operate. This is impossible where the rollers are mounted on a revolving frame.

The main driving-shaft 7 extends vertically the whole height of the system and is provided with a main driving-pulley 28, belted to any convenient counter-shaft by belt 29 and smaller pulleys 6 6, over which runs the motive power 5 that revolves the pans.

Each of the crushing-rollers 22 is placed just above one of the rollers on which the pan rests and revolves, so that in the operation of the machine the pan is not subjected to any strain, but acts only to convey the material under the roller, which crushes it, being solidly resisted by the roller-bearing 9 under the pan.

The operation of the machine is as follows: The gangue is placed in the pan with the addition of water, and a quantity of mercury is placed in the bottom of each trap by pouring it in through the open top of the hollow central shaft. The revolution of the shaft secures more complete amalgamation as well as an automatic clearing action in case of clogging by sticks or sand. The pan is then revolved and the gangue brought under the rollers, which crush it into pulp, which overflows through the pipes into the central shaft and down through the body of mercury in the trap. Just enough mercury should be poured in in the beginning to cover the bottom of the shaft, so that the pulp has to pass through the mercury in order to escape by the pipes 11 into the next lower machine and yet has not to exert more pressure in order to do so than its own weight will furnish. When any large piece or mass of gangue passes under one of the rollers, the roller yields as much as the spring will allow, raising the plunger to which its shaft is pivoted and slightly rising on the pivot of the central ring. This prevents undue jamming or wrenching of the machine.

The pulp coming from the mercury-trap of the first machine will be found to be from thirty to forty mesh fine. This pulp passing into the second pan of the system will be ground to sixty to eighty mesh fine, also passing through a mercury-trap into the third pan, where it will be ground to one hundred to one hundred and ten mesh fine, again passing through a mercury-trap to the concentrator, if necessary.

What I claim as new and of my invention is—

1. The combination of a revolving annular pan, a ring carried in bearings fixed to the pan, stationary crushing-rollers each having one of its journal-boxes pivoted to the ring while the other is movable vertically, and springs bearing the rollers downward.

2. The combination of a revolving annular pan, stationary crushing mechanisms acting therein, and a ring journaled to the center of the pan and adapted as a support for said mechanisms.

3. A mercury-trap consisting of a stationary receptacle with discharge-pipes from its upper part, and a revolving delivery-tube projecting downward into said receptacle.

4. The combination of crushing mechanism, a rotating pan, a hollow shaft projecting downward from the pan and rotating therewith, and pulp-discharging pipes from the pan to the interior of the shaft, the whole arranged to discharge the pulp by gravity.

5. The combination of crushing mechanism, a rotating pan, a hollow central shaft revolving with the pan, pulp-discharging pipes from the pan to the shaft also revolving with the pan, and a mercury-receptacle into which the shaft dips.

6. The combination of crushing mechanism, a rotating pan, a hollow central shaft revolving with the pan, pulp-discharging pipes from the pan to the shaft also revolving with the pan, and a mercury-trap consisting of a box completely inclosing the end of the shaft and provided with outlets.

7. The combination of crushing mechanism, an annular pan, a hollow central shaft, pulp-conduits from the pan to the shaft, and a mercury-trap into which the shaft leads.

ALBERTO T. VAN HORN.

Witnesses:
F. V. HILLER,
LEPINE HALL RICE.